United States Patent
Ustarroz-Calonge et al.

(10) Patent No.: US 12,167,046 B2
(45) Date of Patent: Dec. 10, 2024

(54) ALPHA CHANNEL POST PROCESSING IN IMAGE CODING

(71) Applicant: Google LLC, Mountain View, CA (US)

(72) Inventors: Maryla Ustarroz-Calonge, Paris (FR); Pascal Massimino, Orsay (FR)

(73) Assignee: GOOGLE LLC, Mountain View, CA (US)

( * ) Notice: Subject to any disclaimer, the term of this patent is extended or adjusted under 35 U.S.C. 154(b) by 495 days.

(21) Appl. No.: 17/354,626

(22) Filed: Jun. 22, 2021

(65) Prior Publication Data

US 2022/0014792 A1  Jan. 13, 2022

(30) Foreign Application Priority Data

Jul. 7, 2020 (EP) ..................... 20305775

(51) Int. Cl.
*H04N 19/86* (2014.01)
(52) U.S. Cl.
CPC ..................... *H04N 19/86* (2014.11)
(58) Field of Classification Search
None
See application file for complete search history.

(56) References Cited

U.S. PATENT DOCUMENTS

| | | |
|---|---|---|
| 9,205,562 B1 | 12/2015 | Konolige et al. |
| 2014/0254676 A1* | 9/2014 | Jiang ............... H04N 19/176 375/240.12 |
| 2016/0029030 A1* | 1/2016 | Mrak ............... H04N 19/593 375/240.12 |

FOREIGN PATENT DOCUMENTS

| | | | |
|---|---|---|---|
| CN | 102622776 A | 8/2012 | |
| EP | 1571850 A2 * | 9/2005 | ........... H04N 19/103 |
| GB | 2512657 A | 10/2014 | |

OTHER PUBLICATIONS

Bilateral filter after Inverse Transform. Strom et al. (Year: 2016).*
European Search Report for application No. 20305775.7 dated Dec. 18, 2020, 12 pages.
Jacob Strom et al. "Bilateral filter after inverse transform", Jvet Meeting Oct. 25, 2016; retreived from the internet : URL: http://phenix.int-evry.fr/jvet/doc_end_user/documents/4_Chengdu/wgll/JVET-D0069-v8.zip.
Naccari et al; "RExt HLS (AHG5 and 9): SEI message for alpha channel information" JCT-VC Meeting; Sep. 1, 2014; (Joint Collaborative Team on Video Coding of ISO/IEC JTC1/SC29/WG11 and ITU-T SG.16); Jan. 16, 2014.

(Continued)

*Primary Examiner* — Delomia L Gilliard
(74) *Attorney, Agent, or Firm* — Young Basile Hanlon & MacFarlane, P.C.

(57) ABSTRACT

Alpha channel post processing in image coding can include decoding, from multiple color channels of a bitstream, color channel values for an encoded image, decoding, from an alpha channel of the bitstream, alpha channel values for the encoded image, determining a bilateral filter based on a level of compression for encoding the alpha channel, post processing the alpha channel values by filtering the alpha channel values using the bilateral filter to obtain filtered alpha channel values, and generating at least a portion of a reconstructed image corresponding to the encoded image using the filtered alpha channel values and the color channel values.

21 Claims, 7 Drawing Sheets

(56) References Cited

OTHER PUBLICATIONS

"Bilateral Filter"; Wikipedia article dated Jun. 9, 2019; retreived from the internet on Jun. 21, 2021: https://web.archive.org/web/20190717023608/https://en.wikipedia.org/wiki/Bilateral_filter, 4 pages.
"Deblocking Filter"; Wikipedia article dated Sep. 15, 2019; retrieved from the Internet on Jun. 21, 2021: https://web.archive.org/web/20200521052442/https://en.wikipedia.org/wiki/Deblocking_filter; 2 pages.

* cited by examiner

| 0.3678794412 | 0.6065306597 | 0.3678794412 |
|---|---|---|
| 0.6065306597 | 1 | 0.6065306597 |
| 0.3678794412 | 0.6065306597 | 0.3678794412 |

FIG. 7A

| 0.1353352832 | 0.2865047969 | 0.3678794412 | 0.2865047969 | 0.1353352832 |
|---|---|---|---|---|
| 0.2865047969 | 0.6065306597 | 0.7788007831 | 0.6065306597 | 0.2865047969 |
| 0.3678794412 | 0.7788007831 | 1 | 0.7788007831 | 0.3678794412 |
| 0.2865047969 | 0.6065306597 | 0.7788007831 | 0.6065306597 | 0.2865047969 |
| 0.1353352832 | 0.2865047969 | 0.3678794412 | 0.2865047969 | 0.1353352832 |

FIG. 7B

| 1 | 0.9801986733 | 0.9231163464 | 0.8352702114 | 0.7261490371 | 0.6065306597 | 0.4867522561 | 0.3753110989 | 0.2780373005 | ... |

FIG. 8A

| 1 | 0.9950124792 | 0.9801986733 | 0.9559974818 | 0.9231163464 | 0.8824969026 | 0.8352702114 | 0.7827045382 | 0.7261490371 | ... |

FIG. 8B

| 1 | 0.9987507809 | 0.9950124792 | 0.9888130446 | 0.9801986733 | 0.9692332345 | 0.9559974818 | 0.9405880634 | 0.9231163464 | ... |

FIG. 8C

ALPHA CHANNEL POST PROCESSING IN IMAGE CODING

BACKGROUND

Image content (e.g., still images or frames of a video) represents a significant amount of online content. For example, a web page may include multiple images, and a large portion of the time and resources spent rendering the web page are dedicated to rendering those images for display. The amount of time and resources required to receive and render an image for display depends in part on the manner in which the image is compressed. As such, an image can be rendered faster by reducing the total data size of the image using compression and decompression techniques.

SUMMARY

Compression and decompression techniques can introduce artifacts and other reconstruction errors to an image. Post processing designed specifically for the alpha channel can improve image quality by reducing the visibility of these errors.

A first aspect of the teachings herein is a method of coding using alpha channel post processing. The method may include decoding, from multiple color channels of a bitstream, color channel values for an encoded image and decoding, from an alpha channel of the bitstream, alpha channel values for the encoded image. The method may also include determining a bilateral filter based on a level of compression for encoding the alpha channel, post processing the alpha channel values by filtering the alpha channel values using the bilateral filter to obtain filtered alpha channel values, and generating at least a portion of a reconstructed image corresponding to the encoded image using the filtered alpha channel values and the color channel values.

Another aspect of the teachings herein is an apparatus to perform methods of coding using alpha channel post processing described herein. The apparatus can be an image or frame decoder. The apparatus can include a processor and a memory storing instruction that, upon execution, cause the processor to perform methods of coding using alpha channel post processing described herein.

These and other aspects of the present disclosure are disclosed in the following detailed description of the embodiments, the appended claims, and the accompanying figures.

BRIEF DESCRIPTION OF THE DRAWINGS

FIG. 7A is a first example of a spatial kernel of a bilateral filter for alpha channel post processing.

FIG. 7B is a second example of a spatial kernel of a bilateral filter for alpha channel post processing.

FIG. 8A is a first example of a range kernel of a bilateral filter for alpha channel post processing.

FIG. 8B is a second example of a range kernel of a bilateral filter for alpha channel post processing.

FIG. 8C is a third example of a range kernel of a bilateral filter for alpha channel post processing.

DETAILED DESCRIPTION

Image and video compression schemes may include breaking an image, or frame, into smaller portions, such as blocks, and generating an output bitstream using techniques to minimize the bandwidth utilization of the information included for each block in the output. The techniques can include limiting the information by reducing spatial redundancy, reducing temporal redundancy, or a combination thereof. For example, temporal or spatial redundancies may be used to predict a block, or a portion thereof, such that the difference, or residual, between the predicted and original blocks is represented in the bitstream. The residual may be further compressed by transforming its information into transform coefficients, quantizing the transform coefficients, and entropy coding the quantized transform coefficients. Other coding information, such as that needed to reconstruct the block from the encoded block information, may also be included in the bitstream, The image may comprise three color channels, such as one luma and two chroma channels, and optionally an alpha channel describing transparency information. When decoding a color channel, a deblocking filter may be applied to reconstructed data to mitigate block edge artifacts. However, the alpha channel has different characteristics than color channels, making a deblocking filter less useful for post processing.

Implementations of the teachings herein describe alpha channel post processing, and more particularly a post processing filter that is specific to the alpha channel. Details are described herein with initial reference to a system in which the teachings herein can be implemented.

Figure 1:
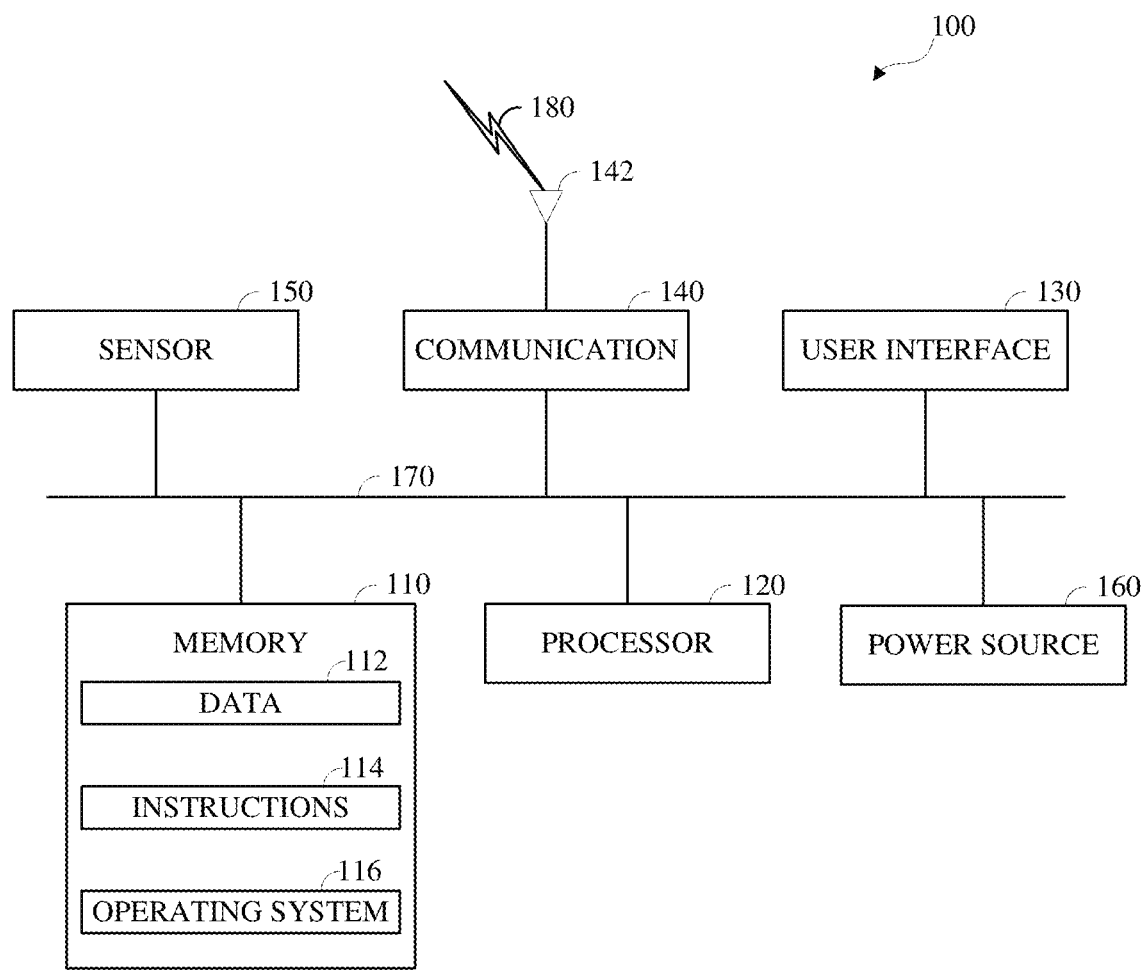
FIG. 1 is a diagram of a computing device in accordance with implementations of this disclosure.

FIG. 1 is a diagram of a computing device 100 in accordance with implementations of this disclosure. The computing device 100 shown includes a memory 110, a processor 120, a user interface (UI) 130, an electronic communication unit 140, a sensor 150, a power source 160, and a bus 170. As used herein, the term "computing device" includes any unit, or combination of units, capable of performing any method, or any portion or portions thereof, disclosed herein.

The computing device 100 may be a stationary computing device, such as a personal computer (PC), a server, a workstation, a minicomputer, or a mainframe computer; or a mobile computing device, such as a mobile telephone, a personal digital assistant (PDA), a laptop, or a tablet PC. Although shown as a single unit, any one element or elements of the computing device 100 can be integrated in any number of separate physical units. For example, the user interface 130 and processor 120 can be integrated in a first physical unit, and the memory 110 can be integrated in a second physical unit.

The memory 110 can include any non-transitory computer-usable or computer-readable medium, such as any tangible device that can, for example, contain, store, communicate, or transport data 112, instructions 114, an operating system 116, or any information associated therewith, for use by or in connection with other components of the computing device 100. The non-transitory computer-usable or computer-readable medium can be, for example, a solid state drive, a memory card, removable media, a read-only memory (ROM), a random-access memory (RAM), any type of disk including a hard disk, a floppy disk, an optical disk, a magnetic or optical card, an application-specific integrated circuit (ASIC), or any type of non-transitory media suitable for storing electronic information, or any combination thereof.

Although shown as a single unit, the memory 110 may include multiple physical units, such as one or more primary memory units, such as random-access memory units, one or more secondary data storage units, such as disks, or a combination thereof. For example, the data 112, or a portion thereof, the instructions 114, or a portion thereof, or both, may be stored in a secondary storage unit and may be loaded or otherwise transferred to a primary storage unit in conjunction with processing the respective data 112, executing the respective instructions 114, or both. In some implementations, the memory 110, or a portion thereof, may be removable memory.

The data 112 can include information, such as input audio and/or visual data, encoded audio and/or visual data, decoded audio and/or visual data, or the like. The visual data can include still images, frames of video sequences, and/or video sequences. The instructions 114 can include directions, such as code, for performing any method, or any portion or portions thereof, disclosed herein. The instructions 114 can be realized in hardware, software, or any combination thereof. For example, the instructions 114 may be implemented as information stored in the memory 110, such as a computer program, that may be executed by the processor 120 to perform any of the respective methods, algorithms, aspects, or combinations thereof, as described herein.

Although shown as included in the memory 110, in some implementations, the instructions 114, or a portion thereof, may be implemented as a special-purpose processor, or circuitry, that can include specialized hardware for carrying out any of the methods, algorithms, aspects, or combinations thereof, as described herein. Portions of the instructions 114 can be distributed across multiple processors on the same machine or different machines or across a network, such as a local area network, a wide area network, the Internet, or a combination thereof.

The processor 120 can include any device or system, now-existing or hereafter developed, capable of manipulating or processing a digital signal or other electronic information, including optical processors, quantum processors, molecular processors, or a combination thereof. For example, the processor 120 can include a special-purpose processor, a central processing unit (CPU), a digital signal processor (DSP), a plurality of microprocessors, one or more microprocessors in association with a DSP core, a controller, a microcontroller, an ASIC, a Field Programmable Gate Array (FPGA), a programmable logic array, a programmable logic controller, microcode, firmware, any type of integrated circuit (IC), a state machine, or any combination thereof. As used herein, the term "processor" includes a single processor or multiple processors.

The user interface 130 can include any unit capable of interfacing with a user, such as a virtual or physical keypad, a touchpad, a display, a touch display, a speaker, a microphone, a video camera, a sensor, or any combination thereof. For example, the user interface 130 may be an audio-visual display device, and the computing device 100 may present audio, such as decoded audio, using the user interface 130 audio-visual display device, such as in conjunction with displaying video, such as decoded video. Although shown as a single unit, the user interface 130 may include one or more physical units. For example, the user interface 130 may include an audio interface for performing audio communication with a user, and a touch display for performing visual and touch-based communication with the user.

The electronic communication unit 140 can transmit, receive, or transmit and receive signals via a wired or wireless electronic communication medium 180, such as a radio frequency (RF) communication medium, an ultraviolet (UV) communication medium, a visible light communication medium, a fiber-optic communication medium, a wireline communication medium, or a combination thereof. For example, as shown, the electronic communication unit 140 is operatively connected to an electronic communication interface 142, such as an antenna, configured to communicate via wireless signals.

Although the electronic communication interface 142 is shown as a wireless antenna in FIG. 1, the electronic communication interface 142 can be a wireless antenna, as shown, a wired communication port, such as an Ethernet port, an infrared port, a serial port, or any other wired or wireless unit capable of interfacing with a wired or wireless electronic communication medium 180. Although FIG. 1 shows a single electronic communication unit 140 and a single electronic communication interface 142, any number of electronic communication units and any number of electronic communication interfaces can be used.

The sensor 150 may include, for example, an audio-sensing device, a visible light-sensing device, a motion-sensing device, or a combination thereof. For example, the sensor 150 may include a sound-sensing device, such as a microphone, or any other sound-sensing device, now existing or hereafter developed, that can sense sounds in the proximity of the computing device 100, such as speech or other utterances, made by a user operating the computing device 100. In another example, the sensor 150 may include a camera, or any other image-sensing device, now existing or hereafter developed, that can sense an image, such as the image of a user operating the computing device. Although a single sensor 150 is shown, the computing device 100 may include a number of sensors 150. For example, the computing device 100 may include a first camera oriented with a field of view directed toward a user of the computing device 100 and a second camera oriented with a field of view directed away from the user of the computing device 100.

The power source 160 can be any suitable device for powering the computing device 100. For example, the power source 160 can include a wired external power source interface; one or more dry cell batteries, such as nickel-cadmium (NiCd), nickel-zinc (NiZn), nickel metal hydride (NiMH), lithium-ion (Li-ion); solar cells; fuel cells; or any other device capable of powering the computing device 100. Although a single power source 160 is shown in FIG. 1, the computing device 100 may include multiple power sources 160, such as a battery and a wired external power source interface.

Although shown as separate units, the electronic communication unit 140, the electronic communication interface 142, the user interface 130, the power source 160, or portions thereof, may be configured as a combined unit. For example, the electronic communication unit 140, the electronic communication interface 142, the user interface 130, and the power source 160 may be implemented as a communications port capable of interfacing with an external display device, providing communications, power, or both.

One or more of the memory 110, the processor 120, the user interface 130, the electronic communication unit 140, the sensor 150, or the power source 160 may be operatively coupled via a bus 170. Although a single bus 170 is shown in FIG. 1, a computing device 100 may include multiple buses. For example, the memory 110, the processor 120, the user interface 130, the electronic communication unit 140, the sensor 150, and the bus 170 may receive power from the power source 160 via the bus 170. In another example, the memory 110, the processor 120, the user interface 130, the electronic communication unit 140, the sensor 150, the power source 160, or a combination thereof, may communicate data, such as by sending and receiving electronic signals, via the bus 170.

Although not shown separately in FIG. 1, one or more of the processor 120, the user interface 130, the electronic communication unit 140, the sensor 150, or the power source 160 may include internal memory, such as an internal buffer or register. For example, the processor 120 may include internal memory (not shown) and may read data 112 from the memory 110 into the internal memory (not shown) for processing.

Although shown as separate elements, the memory 110, the processor 120, the user interface 130, the electronic communication unit 140, the sensor 150, the power source 160, and the bus 170, or any combination thereof, can be integrated in one or more electronic units, circuits, or chips.

Figure 2:
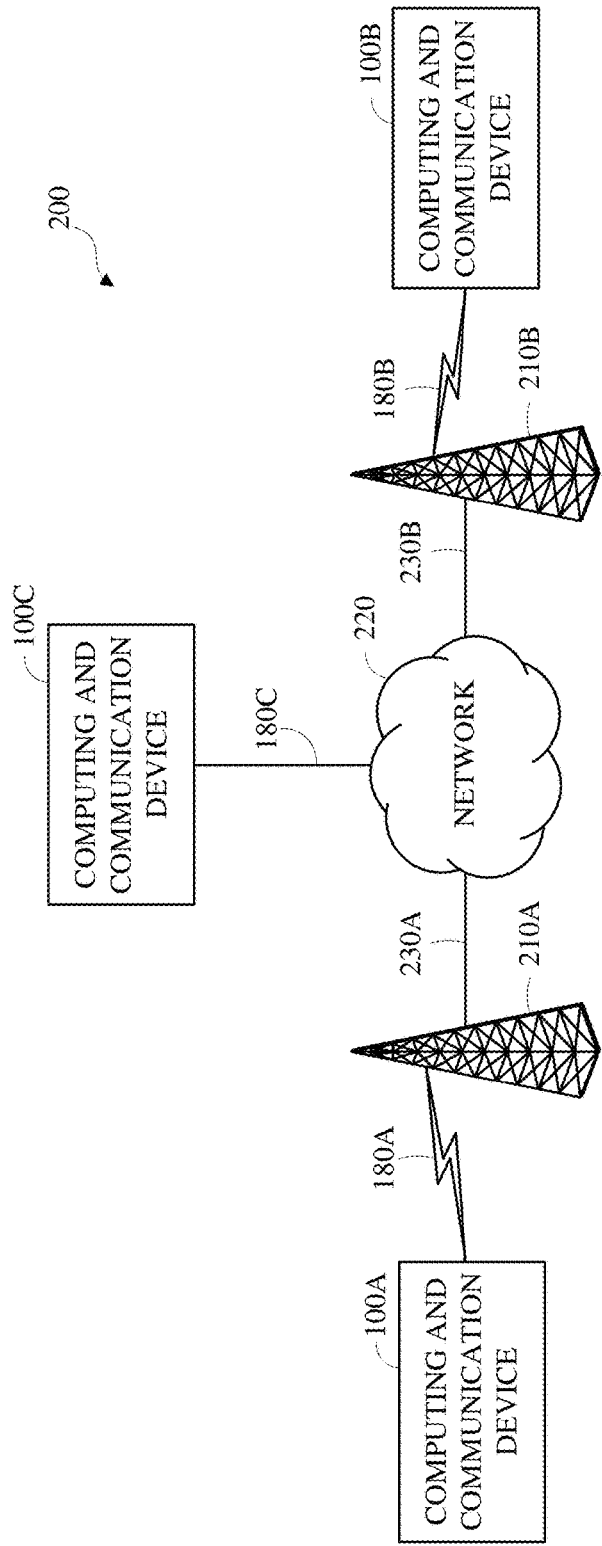
FIG. 2 is a diagram of a computing and communications system in accordance with implementations of this disclosure.

FIG. 2 is a diagram of a computing and communications system 200 in accordance with implementations of this disclosure. The computing and communications system 200 shown includes computing and communication devices 100A, 100B, 100C, access points 210A, 210B, and a network 220. For example, the computing and communications system 200 can be a multiple access system that provides communication, such as voice, audio, data, video, messaging, broadcast, or a combination thereof, to one or more wired or wireless communicating devices, such as the computing and communication devices 100A, 100B, 100C. Although, for simplicity, FIG. 2 shows three computing and communication devices 100A, 100B, 100C, two access points 210A, 210B, and one network 220, any number of computing and communication devices, access points, and networks can be used.

A computing and communication device 100A, 100B, or 100C can be, for example, a computing device, such as the computing device 100 shown in FIG. 1. For example, the computing and communication devices 100A, 100B may be user devices, such as a mobile computing device, a laptop, a thin client, or a smartphone, and the computing and communication device 100C may be a server, such as a mainframe or a cluster. Although the computing and communication device 100A and the computing and communication device 100B are described as user devices, and the computing and communication device 100C is described as a server, any computing and communication device may perform some or all of the functions of a server, some or all of the functions of a user device, or some or all of the functions of a server and a user device. For example, the server computing and communication device 100C may receive, encode, process, store, transmit, or a combination thereof, audio data; and one or both of the computing and communication device 100A and the computing and communication device 100B may receive, decode, process, store, present, or a combination thereof, the audio data.

Each computing and communication device 100A, 100B, 100C, which may include a user equipment (UE), a mobile station, a fixed or mobile subscriber unit, a cellular telephone, a personal computer, a tablet computer, a server, consumer electronics, or any similar device, can be configured to perform wired or wireless communication, such as via the network 220. For example, the computing and communication devices 100A, 100B, 100C can be configured to transmit or receive wired or wireless communication signals. Although each computing and communication device 100A, 100B, 100C is shown as a single unit, a computing and communication device can include any number of interconnected elements.

Each access point 210A, 210B can be any type of device configured to communicate with a computing and communication devices 100A, 100B, 100C, a network 220, or both via wired or wireless communication links 180A, 180B, 180C. For example, an access point 210A, 210B can include a base station, a base transceiver station (BTS), a Node-B, an enhanced Node-B (eNode-B), a Home Node-B (HNode-B), a wireless router, a wired router, a hub, a relay, a switch, or any similar wired or wireless device. Although each access point 210A, 210B is shown as a single unit, an access point can include any number of interconnected elements.

The network 220 can be any type of network configured to provide services, such as voice, data, applications, voice over internet protocol (VoIP), or any other communications protocol or combination of communications protocols, over a wired or wireless communication link. For example, the network 220 can be a local area network (LAN), wide area network (WAN), virtual private network (VPN), a mobile or cellular telephone network, the Internet, or any other means of electronic communication. The network can use a communication protocol, such as the Transmission Control Protocol (TCP), the User Datagram Protocol (UDP), the Internet Protocol (IP), the Real-time Transport Protocol (RTP), the HyperText Transport Protocol (HTTP), or a combination thereof.

The computing and communication devices 100A, 100B, 100C can communicate with each other via the network 220 using one or more wired or wireless communication links, or via a combination of wired and wireless communication links. For example, as shown, the computing and communication devices 100A, 100B can communicate via wireless communication links 180A, 180B, and computing and communication device 100C can communicate via a wired communication link 180C. Any of the computing and communication devices 100A, 100B, 100C may communicate using any wired or wireless communication link or links. For example, a first computing and communication device 100A can communicate via a first access point 210A using a first type of communication link, a second computing and communication device 100B can communicate via a second access point 210B using a second type of communication link, and a third computing and communication device 100C can communicate via a third access point (not shown) using a third type of communication link. Similarly, the access points 210A, 210B can communicate with the network 220 via one or more types of wired or wireless communication links 230A, 230B. Although FIG. 2 shows the computing and communication devices 100A, 100B, 100C in communication via the network 220, the computing and communication devices 100A, 100B, 100C can communicate with each other via any number of communication links, such as a direct wired or wireless communication link.

In some implementations, communications between one or more of the computing and communication devices 100A, 100B, 100C may omit communicating via the network 220 and may include transferring data via another medium (not shown), such as a data storage device. For example, the server computing and communication device 100C may store audio data, such as encoded audio data, in a data storage device, such as a portable data storage unit, and one or both of the computing and communication device 100A or the computing and communication device 100B may access, read, or retrieve the stored audio data from the data storage unit, such as by physically disconnecting the data storage device from the server computing and communication device 100C and physically connecting the data storage device to the computing and communication device 100A or the computing and communication device 100B.

Other implementations of the computing and communications system 200 are possible. For example, in an implementation, the network 220 can be an ad-hoc network and can omit one or more of the access points 210A, 210B. The computing and communications system 200 may include devices, units, or elements not shown in FIG. 2. For example, the computing and communications system 200 may include many more communicating devices, networks, and access points.

Figure 3:
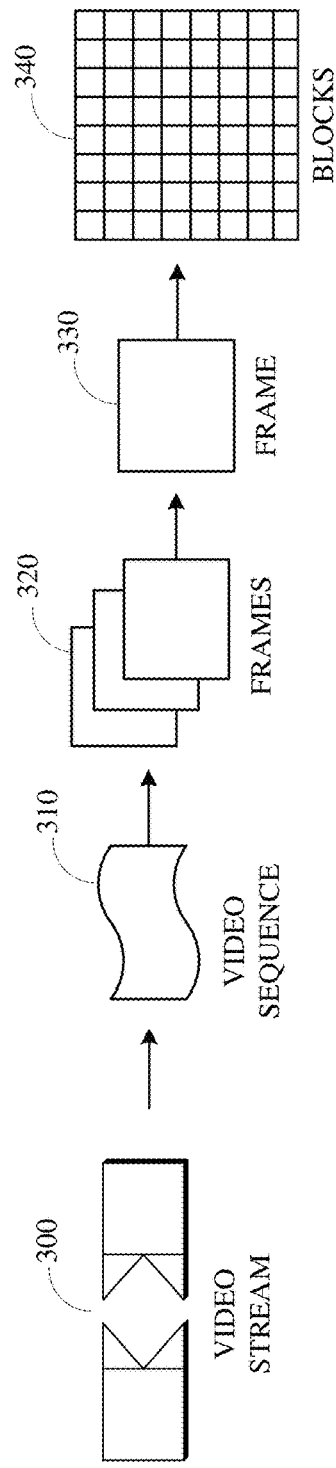
FIG. 3 is a diagram of a video stream for use in encoding and decoding in accordance with implementations of this disclosure.

FIG. 3 is a diagram of a video stream 300 for use in encoding and decoding in accordance with implementations of this disclosure. A video stream 300, such as a video stream captured by a video camera or a video stream generated by a computing device, may include a video sequence 310. The video sequence 310 may include a sequence of adjacent frames 320. Although three adjacent frames 320 are shown, the video sequence 310 can include any number of adjacent frames 320.

Each frame 330 from the adjacent frames 320 may represent a single image from the video stream. Although not shown in FIG. 3, a frame 330 may include one or more segments, tiles, or planes, which may be coded, or otherwise processed, independently, such as in parallel. A frame 330 may include blocks 340. Although not shown in FIG. 3, a block can include pixels. For example, a block can include a 16×16 group of pixels, an 8×8 group of pixels, an 8×16 group of pixels, or any other group of pixels. Unless otherwise indicated herein, the term "block" can include a superblock, a macroblock, a segment, a slice, or any other portion of a frame. A frame, a block, a pixel, or a combination thereof, can include display information, such as luminance information, chrominance information, or any other information that can be used to store, modify, communicate, or display the video stream or a portion thereof.

Figure 4:
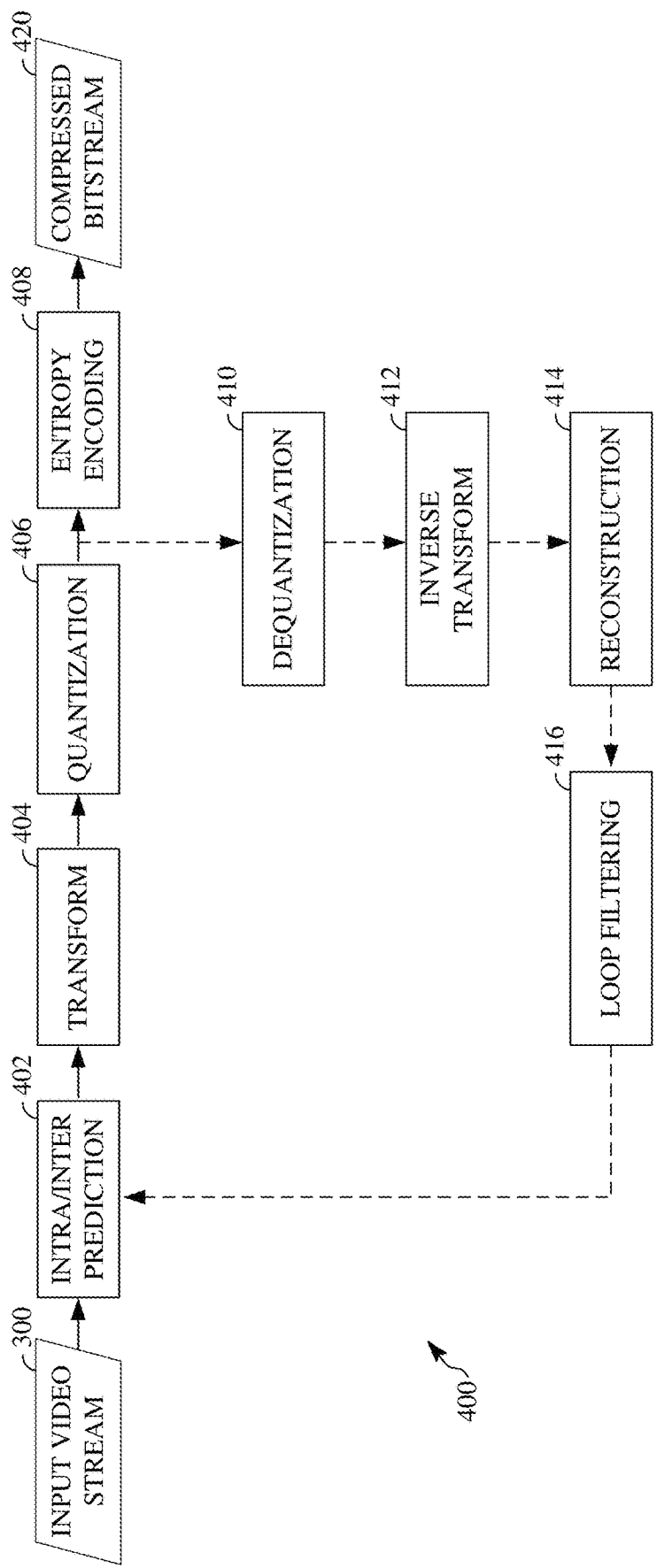
FIG. 4 is a block diagram of an encoder in accordance with implementations of this disclosure.

FIG. 4 is a block diagram of an encoder 400 in accordance with implementations of this disclosure. Encoder 400 can be implemented in a device, such as the computing device 100 shown in FIG. 1 or the computing and communication devices 100A, 100B, 100C shown in FIG. 2, as, for example, a computer software program stored in a data storage unit, such as the memory 110 shown in FIG. 1. The computer software program can include machine-readable instructions that may be executed by a processor, such as the processor 120 shown in FIG. 1, and may cause the device to encode video data as described herein. The encoder 400 can be implemented as specialized hardware included, for example, in the computing device 100.

The encoder 400 has the following stages to perform the various functions in a forward path (shown by the solid connection lines) to produce an encoded or compressed bitstream 420 using the video stream 300 as input: an intra/inter prediction stage 402, a transform stage 404, a quantization stage 406, and an entropy encoding stage 408.

The encoder 400 may also include a reconstruction path (shown by the dotted connection lines) to reconstruct a frame for encoding of future blocks. In FIG. 4, the encoder 400 has the following stages to perform the various functions in the reconstruction path: a dequantization stage 410, an inverse transform stage 412, a reconstruction stage 414, and a loop filtering stage 416. Other structural variations of the encoder 400 can be used to encode the video stream 300.

In some cases, the functions performed by the encoder 400 may occur after a filtering of the video stream 300. That is, the video stream 300 may undergo pre-processing according to one or more implementations of this disclosure prior to the encoder 400 receiving the video stream 300. Alternatively, the encoder 400 may itself perform such pre-processing against the video stream 300 prior to proceeding to perform the functions described with respect to FIG. 4, such as prior to the processing of the video stream 300 at the intra/inter prediction stage 402.

When the video stream 300 is presented for encoding after the pre-processing is performed, respective adjacent frames 320, such as the frame 330, can be processed in units of blocks. At the intra/inter prediction stage 402, respective blocks can be encoded using intra-frame prediction (also called intra-prediction) or inter-frame prediction (also called inter-prediction). In any case, a prediction block can be formed. In the case of intra-prediction, a prediction block may be formed from samples in the current frame that have been previously encoded and reconstructed. In the case of inter-prediction, a prediction block may be formed from samples in one or more previously constructed reference frames.

Next, the prediction block can be subtracted from the current block at the intra/inter prediction stage 402 to produce a residual block (also called a residual). The transform stage 404 transforms the residual into transform coefficients in, for example, the frequency domain using block-based transforms. The quantization stage 406 converts the transform coefficients into discrete quantum values, which are referred to as quantized transform coefficients, using a quantizer value or a quantization level. For example, the transform coefficients may be divided by the quantizer value and truncated.

The quantized transform coefficients are then entropy encoded by the entropy encoding stage 408. The entropy-encoded coefficients, together with other information used to decode the block (which may include, for example, syntax elements such as used to indicate the type of prediction used, transform type, motion vectors, a quantizer value, or the like), are then output to the compressed bitstream 420. The compressed bitstream 420 can be formatted using various techniques, such as variable length coding or arithmetic coding. The compressed bitstream 420 can also be referred to as an encoded video stream or encoded video bitstream, and the terms will be used interchangeably herein.

The reconstruction path (shown by the dotted connection lines) can be used to ensure that the encoder 400 and a decoder 500 (described below with respect to FIG. 5) use the same reference frames to decode the compressed bitstream 420. The reconstruction path performs functions that are similar to functions that take place during the decoding process (described below with respect to FIG. 5), including dequantizing the quantized transform coefficients at the dequantization stage 410 and inverse transforming the dequantized transform coefficients at the inverse transform stage 412 to produce a derivative residual block (also called a derivative residual).

At the reconstruction stage 414, the prediction block that was predicted at the intra/inter prediction stage 402 can be added to the derivative residual to create a reconstructed block. The loop filtering stage 416 can apply an in-loop filter or other filter to the reconstructed block to reduce distortion such as blocking artifacts. Examples of filters which may be applied at the loop filtering stage 416 include, without limitation, a deblocking filter, a directional enhancement filter, and a loop restoration filter.

Other variations of the encoder 400 can be used to encode the compressed bitstream 420. In some implementations, a non-transform based encoder can quantize the residual signal directly without the transform stage 404 for certain blocks or frames. In some implementations, an encoder can have the quantization stage 406 and the dequantization stage 410 combined in a common stage.

Figure 5:
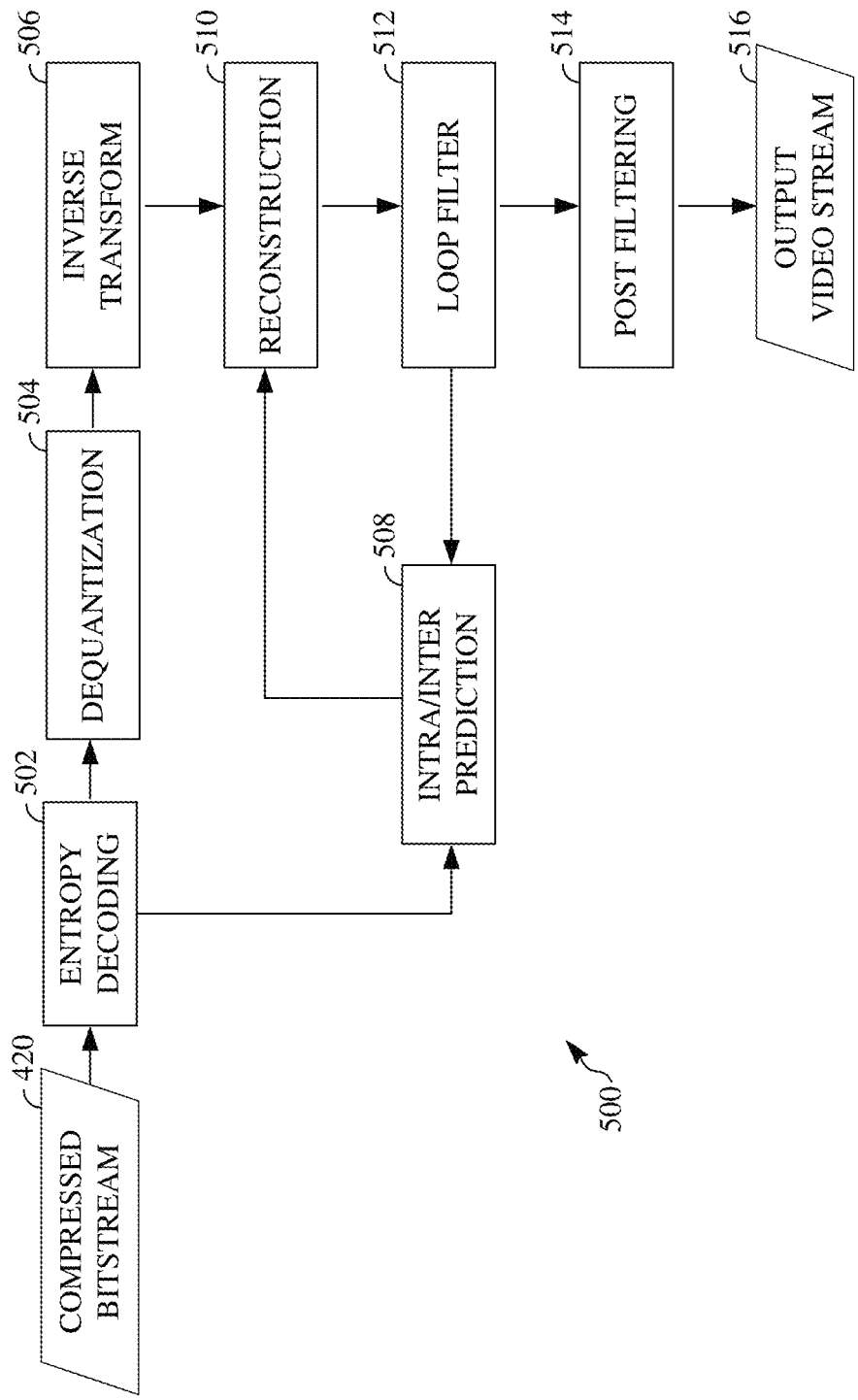
FIG. 5 is a block diagram of a decoder in accordance with implementations of this disclosure.

FIG. 5 is a block diagram of a decoder 500 in accordance with implementations of this disclosure. The decoder 500 can be implemented in a device, such as the computing device 100 shown in FIG. 1 or the computing and communication devices 100A, 100B, 100C shown in FIG. 2, as, for example, a computer software program stored in a data storage unit, such as the memory 110 shown in FIG. 1. The computer software program can include machine-readable instructions that may be executed by a processor, such as the processor 120 shown in FIG. 1, and may cause the device to decode video data as described herein. The decoder 500 can be implemented as specialized hardware included, for example, in the computing device 100.

The decoder 500, similar to the reconstruction path of the encoder 400 discussed above, includes in one example the following stages to perform various functions to produce an output video stream 516 from the compressed bitstream 420: an entropy decoding stage 502, a dequantization stage 504, an inverse transform stage 506, an intra/inter prediction stage 508, a reconstruction stage 510, a loop filtering stage 512, and a post filter stage 514. Other structural variations of the decoder 500 can be used to decode the compressed bitstream 420.

When the compressed bitstream 420 is presented for decoding, the data elements within the compressed bitstream 420 can be decoded by the entropy decoding stage 502 to produce a set of quantized transform coefficients. The dequantization stage 504 dequantizes the quantized transform coefficients (e.g., by multiplying the quantized transform coefficients by the quantizer value), and the inverse transform stage 506 inverse transforms the dequantized transform coefficients to produce a derivative residual that can be identical to that created by the inverse transform stage 412 in the encoder 400. Using header information decoded from the compressed bitstream 420, the decoder 500 can use the intra/inter prediction stage 508 to create the same prediction block as was created in the encoder 400 (e.g., at the intra/inter prediction stage 402).

At the reconstruction stage 510, the prediction block can be added to the derivative residual to create a reconstructed block. The loop filtering stage 512 can be applied to the reconstructed block to reduce blocking artifacts. Examples of filters which may be applied at the loop filtering stage 512 include, without limitation, a deblocking filter, a directional enhancement filter, and a loop restoration filter. Other filtering can be applied to the reconstructed block. In this example, the post filter stage 514 is applied to the reconstructed block to reduce blocking distortion, and the result is output as the output video stream 516. The output video stream 516 can also be referred to as a decoded video stream, and the terms will be used interchangeably herein.

Other variations of the decoder 500 can be used to decode the compressed bitstream 420. In some implementations, the decoder 500 can produce the output video stream 516 without the post filter stage 514 or otherwise omit the post filter stage 514.

As mentioned above, the alpha channel describes transparency information. As a result, data of the alpha channel has different characteristics from that of color channels, such as typical luma or chroma channels. For example, the alpha channel often contains sharp edges between fully opaque areas (e.g., pixels with values of 255 in an 8-bit representation) and fully transparent areas (e.g., pixels with values of 0). Lossy compression of an image with an alpha channel may thus benefit from using different tools for the alpha channel as compared to those for the color tools. As compared to the inter- or intra-prediction tools described above with regards to FIGS. 4 and 5, an alpha channel may be more efficiently compressed in some circumstances using run-length encoding (RLE) or other techniques. Even where inter- or intra-prediction tools are used, the characteristics of the alpha channel may allow higher compression through a relatively large quantization value as opposed to that used for color channels, or by additional sub-sampling that reduces the number of pixels representing the underlying transparency data. Another technique, used alone or in combination with the previously-described compression techniques for the alpha channel, reduces the number of available values for inclusion in the encoded alpha channel to a smaller subset of values that are optimally selected by the encoder, such as the encoder 400.

At least for the above reasons, lossy compression of the alpha channel often results in very visible compression artifacts, like noise in flat areas that may be referred to as ringing or mosquito noise. To mitigate artifacts in color channels, a deblocking filter may be applied after reconstruction of a channel, such as at the post filtering stage 514. Although deblocking filters may be useful for block edge artifacts even in the alpha channel, they are not useful to mitigate ringing or mosquito noise in the alpha channel. Dithering is another technique that can be used to reduce artifacts in the reconstructed alpha channel when a reduced set of values (e.g., six values) is used for encoding. That is, after reconstructing the alpha channel, dithering may be applied on the values that are neither a minimum value, such as 0, nor a maximum value, such as that associated with 8-bit, 12-bit, etc., representation. The dithering can use random or fixed patterns to perturb the initial values to result in a smoothed gradient in the alpha plane. The smoothed gradient is more visually pleasant than the original highly compressed alpha plane.

While dithering can be a useful technique to reduce banding, it is less successful for ringing or mosquito artifacts. A post processing filter specific to the alpha channel is desirable. A bilateral filter suitable for alpha channel post processing is described beginning with FIG. 6.

Figure 6:
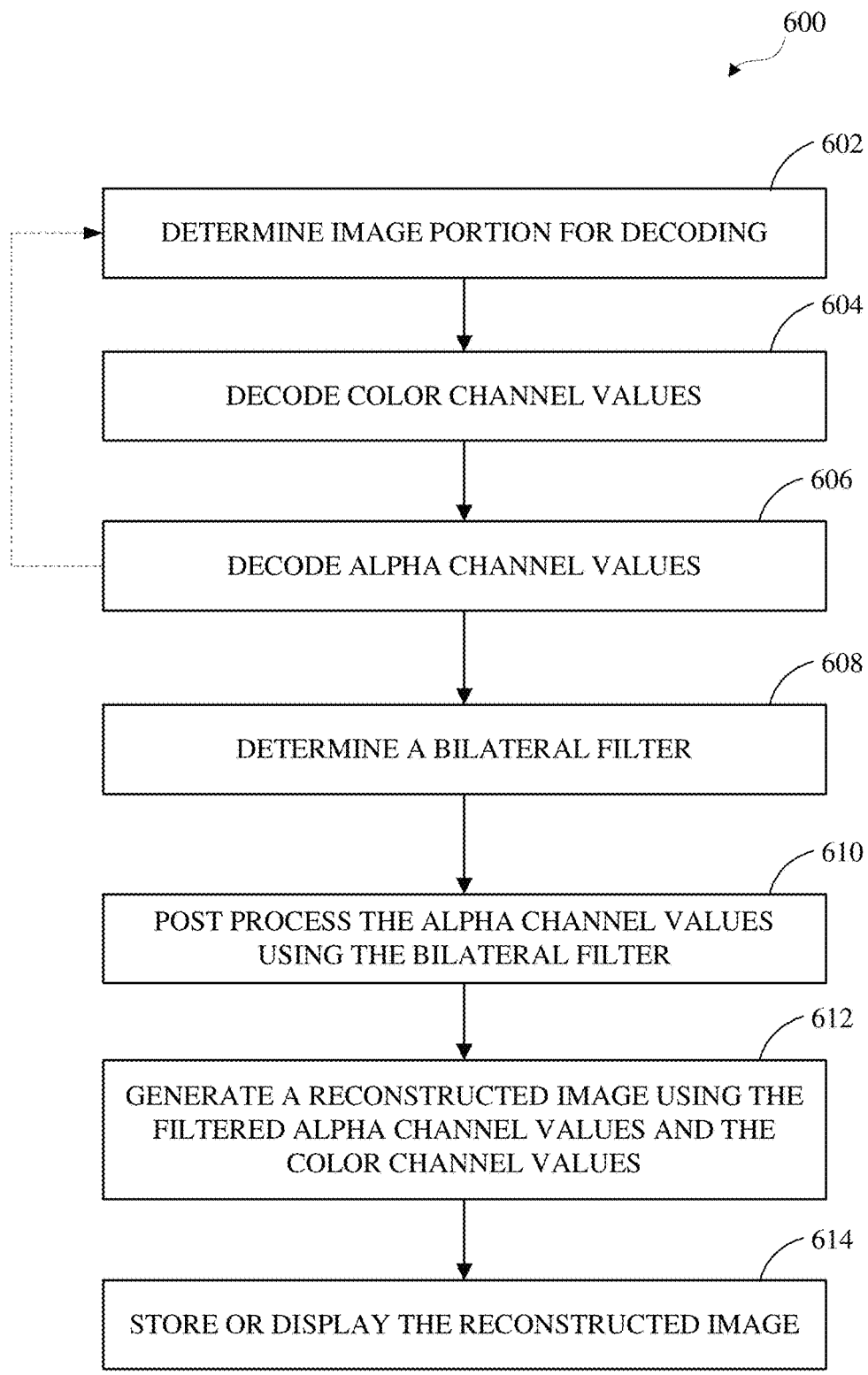
FIG. 6 is a flowchart diagram of a method of coding using alpha channel post processing in accordance with implementations of this disclosure.

FIG. 6 is a flowchart diagram of a technique or method 600 of coding using alpha channel post processing in accordance with implementations of this disclosure. The method 600 may implement image coding, e.g., decoding. The method 600 can be implemented, for example, as a software program that may be executed by computing and communication devices such as one of the computing and communication devices 100A, 100B, 100C of FIG. 2. The software program can include machine-readable instructions that may be stored in a memory such as the memory 110 of FIG. 1, and that, when executed by a processor, such as the processor 120 of FIG. 1, can cause the computing and communication device to perform the method 600. In an example, the media data is an image that can be coded by a decoder, such as the reconstruction loop of the encoder 400 of FIG. 4, or the decoder 500 of FIG. 5. The method 600 can be implemented at least part in the post filtering stage 514. The method 600 can be implemented using specialized hardware or firmware. Multiple processors, memories, or both, may be used.

At least a portion of an image decoding may be determined or identified from an encoded bitstream at 602. Although not expressly shown in FIG. 6, the determining may include obtaining, such as receiving via a wired or wireless electronic communication medium, such as the network 220 shown in FIG. 2, or reading from an electronic data storage medium, such as the memory 110 shown in FIG. 1, the encoded bitstream, such as the compressed bitstream 420. The portion may include a current block or other image portion, such as a block 340 shown in FIG. 3. The portion may correspond to a respective block within one or more color channels including respective color plane data, an alpha channel including alpha plane data, or both, of the encoded image.

At 604, color channel values for the encoded image are decoded from multiple color channels of a bitstream. Each color channel representing the image portion (e.g., a block) may be separately decoded according to a decoding process that corresponds to the encoding process used to encode the image portion within the color channel. For example, the color channel values for a channel may be decoded by entropy decoding the color channel data (e.g., compressed residual data) for a block, dequantizing the entropy decoded values, inverse transforming the dequantized values to obtain a residual, generating an inter- or inter-predicted block used to encode the block, and reconstructing the color channel values of the block by combining the residual with the predicted block, such as described with regards to the decoder 500 of FIG. 5. In this example, the color channels are lossily encoded, but the teachings herein equally apply where the color channels are losslessly encoded.

In some implementations, the color channel values are expressed with reference to a first color space. As a result, the multiple color channels of the bitstream may correspond to the first color space. For example, decoding the color channel values may include decoding the color channel values expressed in a color model based on a luminance component (Y) from a first color channel and two chrominance components (U and V or Cb and Cr) from respective second and third color channels. Accordingly, the decoded color channel values can include a luminance channel value, a first chrominance channel value, and a second chrominance channel value. While the YUV or YCbCr color model, or color space, may be used as the first color space (e.g., the color space for compression or a compressed color space), other color spaces may be used as the first color space.

At 606, alpha channel values for the encoded image are decoded from an alpha channel of the bitstream. Similar to the color channels, data of the alpha channel representing the image portion (e.g., a block) may be separately decoded according to a decoding process that corresponds to the encoding process used to encode the image portion within the alpha channel. For example, the alpha channel values may be decoded by entropy decoding the alpha channel data (e.g., compressed residual data) for a block, dequantizing the entropy decoded values, inverse transforming the dequantized values to obtain a residual, generating an inter- or inter-predicted block used to encode the block, and reconstructing the alpha channel values of the block by combining the residual with the predicted block, such as described with regards to the decoder 500 of FIG. 5. As mentioned previously, additional or other techniques may be used to compress the alpha channel, such as reducing the number of alpha values that are encoded and subsequently decoded.

As shown by the dashed line in FIG. 6, determining an image portion at 602, decoding color channel values at 604, and decoding alpha channel values at 608 may be repeated for each of the encoded image portions within each of the channels. Although shown as a sequence of steps, decoding data of two or more of the channels may be performed concurrently, e.g., using parallel processing, or all encoded data of a respective channel may be decoded at 604 or 606 before proceeding to data of another channel.

After the alpha channel values are decoded at 606, the method 600 includes determining a bilateral filter at 608 based on a level of compression for encoding the alpha channel. For example, a level of compression of the alpha channel may be identified by the value of one or more encoding parameters within or determined from the bitstream that are related to the compression (e.g., the relative quality) of the alpha channel by the encoder. Determining the bilateral filter may occur using a post filtering stage, such as the post filtering stage 514 of the decoder 500.

In some implementations, the level of compression may be determined from the number of alpha values used to encode the alpha channel. For example, and as described briefly above, encoding the alpha channel can include using a reduced (i.e., a proper) subset of available alpha channel values. An encoder, such as the encoder 400, can optimally select the values of the proper subset by forming different combinations of the values and selecting the proper subset as that combination that minimizes the errors resulting from mapping each of the alpha values of the original image to a closest value within the combination.

The size of the proper subset may be a fixed value at the encoder, and hence at a decoder. Where, however, a size of the proper subset of available values for the alpha channel can vary, the level of compression may be indicated by the number of alpha values such that a larger number of values indicates a higher quality of encoding than a fewer number of values. Thus, a proper subset of six values in an 8-bit system (i.e., 256 values) represents a lower quality of encoding the alpha channel than the quality resulting from a proper subset of ten values in the 8-bit system. Further, a proper subset of six values in an 8-bit system represents a higher quality of encoding the alpha channel than the quality resulting from a proper subset of six values in a 10-bit system.

In some implementations, the level of compression may be determined from the quantizer or quantization value of the alpha channel (e.g., decoded from the bitstream). That is, the quantization value of the alpha channel indicates the level of compression. The quantization value is that value used to quantize the alpha channel values in the encoder, such as in the quantization stage 406 of FIG. 4, regardless of how many alpha values are used to represent the original image data. A larger quantization value represents a lower quality of encoding the alpha channel than the quality resulting from a smaller quantization value.

The bilateral filter determined at 608 may be one of a plurality of candidate bilateral filters that is based on the level of compression. Each candidate filter may be associated with a different level of compression. For example, where the quantization value of the alpha channel indicates the level of compression, a first candidate bilateral filter is associated with a first quantization value of the alpha channel, a second candidate bilateral filter is associated with a second quantization value of the alpha channel, the first quantization value is different from the second quantization value, and the first candidate bilateral filter is different from the second candidate bilateral filter.

Generally, a higher quality of encoding the alpha channel is associated with a bilateral filter having a weaker strength as compared to a lower quality of encoding the alpha channel. Stated differently, the lower the quality of encoding the alpha channel, the stronger (e.g., greater) the filtering by the bilateral filter. The higher the quality of encoding the alpha channel, the weaker (e.g., the lesser) the filtering by the bilateral filter. Accordingly, in the example above, where the first quantization value is greater than the second quantization value, the first candidate bilateral filter has a higher strength than the second candidate bilateral filter. Conversely, where the first quantization value is smaller than the second quantization value, the first candidate bilateral filter has a lower strength than the second candidate bilateral filter.

The parameters of a bilateral filter determine its strength. Accordingly, determining the bilateral filter using the level of compression at 608 may include determining or identifying at least one parameter of the bilateral filter using the level of compression. The parameters of the bilateral filter may be determined from the bitstream, inferred from the encoded data, or a combination thereof. The bilateral filter can include a spatial kernel and a range kernel, and these may be considered parameters of the bilateral filter. At least one of the spatial kernel or the range kernel may be based on the level of compression for encoding the alpha channel.

In some implementations, the spatial kernel of the bilateral filter comprises a two-dimensional (2D) kernel of at least two candidate kernel sizes. A candidate kernel size of the at least two candidate kernel sizes increases with the level of compression. For example, a smaller candidate kernel size is associated with a higher quality for encoding the alpha channel as indicated by a first value for the level of compression, and a larger candidate kernel size is associated with a lower quality for encoding the alpha channel as indicated by a second value for the level of compression. The first value for the level of compression and the second value for the level of compression may be different quantization values of the alpha channel, or may be different values of another encoding parameter that indicates the level of compression.

The spatial kernel may be illustrated with reference to FIGS. 7A and 7B. FIG. 7A is a first example of a spatial kernel of a bilateral filter for alpha channel post processing, and FIG. 7B is a second example of a spatial kernel of a bilateral filter for alpha channel post processing. In these examples, the spatial kernel comprises the following equation (1).

$$\exp(-(i^2+j^2)/(2*radius)) \qquad (1)$$

In equation (1), i is a horizontal distance from the kernel center, j is a vertical distance from the kernel center, and radius is an integer that determines the kernel size. In some implementations, radius is an integer based on the level of compression. For example, radius may be either 1 or 2, such that the spatial kernel has a kernel size of either 3×3 or 5×5. In the spatial kernel of FIG. 7A, radius is 1, resulting in a kernel size of 3×3. The kernel center includes a multiplier of 1. In the spatial kernel of FIG. 7B, radius is 2, resulting in a kernel size of 5×5. Again, the kernel center includes a multiplier of 1.

The smaller candidate kernel size of FIG. 7A is associated with a lower level of compression (i.e., a higher quality) for encoding the alpha channel, while the larger candidate kernel size of FIG. 7B is associated with a higher level of compression (i.e., a lower quality) for encoding the alpha channel. Assuming, for example, that the range kernel is unchanged with encoding parameters of the alpha channel, that is, the range kernel does not depend on the level of compression, two candidate bilateral filters would be available, one including the range kernel and the spatial kernel of FIG. 7A, and the other including the range kernel and the spatial kernel of FIG. 7B. Each candidate bilateral filter could be associated with a range of quantization values or other encoding parameter such that the appropriate candidate bilateral filter is selected based on the quantization value or other encoding parameter value used for encoding the alpha channel.

In some implementations, the range kernel of the bilateral filter comprises at least two candidate one-dimensional (1D) kernels. A level of smoothing (e.g., a strength) of the at least two candidate 1D kernels increases with increasing levels of compression. The range kernel can be illustrated with reference to FIGS. 8A to 8C. FIG. 8A is a first example of a range kernel of a bilateral filter for alpha channel post processing, FIG. 8B is a second example of a range kernel of a bilateral filter for alpha channel post processing, and FIG. 8C is a third example of a range kernel of a bilateral filter for alpha channel post processing. In these examples, the range kernel comprises the following equation (2).

$$\exp(-k^2/(2*sigma^2)) \qquad (2)$$

In equation (2), k ranges between 0 and the maximum absolute difference between two pixel values. In an example where the pixel values are between 0 and 255, k ranges from 0 to 255. Further, in equation (2), sigma is a smoothing parameter that is a positive integer, such that different values for the smoothing parameter result in candidate one-dimensional (1D) kernels having different levels of smoothing. In some implementations, sigma comprises one of at least two values, such that the range kernel has one of at least two different levels of smoothing.

In the range kernel of FIG. 8A, sigma is 5. In the range kernel of FIG. 8B, sigma is 10. Finally, in the range kernel of FIG. 8C, sigma is 20. The range kernels of FIGS. 8A-8C only show the first 9 values of each candidate 1D kernel. There are 256 values in this example (corresponding to 8-bit representation of the alpha channel values). The smallest value for sigma in FIG. 8A is associated with a lower level of compression (i.e., a higher quality) for encoding the alpha channel than the higher value for sigma in FIG. 8B. Similarly, the higher value for sigma in FIG. 8B is associated with a lower level of compression (i.e., a higher quality) for encoding the alpha channel than the highest value for sigma in FIG. 8C. More generally, a higher value of sigma, the higher the filter strength of the kernel. While three candidate range kernels are shown, fewer or more candidate range kernels may be used with different values for sigma.

Assuming, for example, that the spatial kernel is unchanged with encoding parameters of the alpha channel, that is, the spatial kernel does not depend on the level of compression, three candidate bilateral filters would be available in this example, one including the spatial kernel and the range kernel of FIG. 8A, a second including the spatial kernel and the range kernel of FIG. 8B, and a third including the spatial kernel and the range kernel of FIG. 8C. Each candidate bilateral filter could be associated with a range of quantization values or other encoding parameter such that the appropriate candidate bilateral filter is selected based on the quantization value or other encoding parameter value used for encoding the alpha channel.

In some implementations of the bilateral filters described herein, a parameter of each of the range kernel and the spatial kernel is based on the level of compression of encoding the alpha channel. In an example, the level of quantization of the alpha channel, which is transmitted in the bitstream, is used to select both a value of radius for the spatial kernel and a value of sigma for the range kernel. That is, candidate bilateral filters may be formed of combinations of spatial kernels of different kernel sizes and range kernels of different smoothing strengths. In examples where the value of radius for the spatial kernel can be 1 or 2 and the value of sigma for the range kernel can be 5, 10, or 20, there may be up to 6 candidate bilateral filters, each associated with respective level of compression of encoding the alpha channel.

In some implementations, determining the bilateral filter at 608 uses a fixed decision tree in the decoder and a level of compression of encoding the alpha channel as indicated by one or more encoding parameters of the alpha channel. In an example, an alpha quality factor "q" may be read or otherwise determined from the bitstream that has a value that ranges from 0 (lowest quality) to 100 (highest quality). The alpha quality factor "q" may be, for example, based on the quantization value of the alpha channel, the number of different alpha values encoded into the alpha channel, or some combination of these encoding parameters or others. A decision tree could implement a selection process using "q". In one non-limiting example, if q is below 50, the bilateral filter uses the spatial kernel having radius equal to 2 and the range kernel having sigma equal to 20. If q is between 50 and 70, the bilateral filter uses the spatial kernel having radius equal to 1 and the range kernel having sigma equal to 20. If q is between 70 and 80, the bilateral filter uses the spatial kernel having radius equal to 1 and the range kernel having sigma equal to 10. If q is between 80 and 100, the bilateral filter uses the spatial kernel having radius equal to 1 and the range kernel having sigma equal to 5.

Once a bilateral filter is determined at 608, the method 600 includes post processing the alpha channel values using the bilateral filter at 610. Post processing may occur using a post filtering stage, such as the post filtering stage 514 of the decoder 500. Post processing the alpha channel values can include filtering the alpha channel values using the bilateral filter to obtain filtered alpha channel values. As just one example of applying the bilateral filter, for brevity, it is assumed that the spatial kernel defined by equation (1) has radius equal to 1 and the range kernel defined by equation (2) has sigma equal to 5. For a pixel at coordinates (1, 1) whose alpha value is 100, the filter loops over all pixels around this kernel center that are in range for the spatial kernel, so at a distance of 1 horizontally or vertically, which means pixels (0, 0), (0, 1), (0, 2), (1, 0), (1, 1), (1, 2), (2, 0), (2, 1), (2, 2). For each pixel, a weight is computed, which is the weight from the spatial kernel, multiplied by the weight from the range kernel. For example, for the pixel at coordinates (0, 0), the spatial weight is 0.3678794412. Assuming the alpha value of pixel (0, 0) is 102, the difference in value with the current pixel is 2, so the range weight is 0.9231163464. The final weight is 0.3678794412*0.9231163464. The new (i.e., filtered) alpha value of the filtered pixel is the weighted sum of the pixels around it, divided by the sum of the weights. When an adjacent pixel to the kernel center is unavailable a value of 0 may be used in the calculations or padding using existing adjacent pixels may be used. Other pixels are similarly filtered.

After post processing the alpha channel values to obtain the filtered alpha channel values at 610, at least a portion of a reconstructed image corresponding to the encoded image is generated at 612 using the filtered alpha channel values and the color channel values. Generating at least the portion of the reconstructed image at 612 can include aligning an alpha layer comprising the filtered alpha channel values with multiple color layers, each comprising the decoded color channel values of a respective color. The reconstructed image may be stored or output at 614, such as via the output stream 516 shown in FIG. 5, such as for presentation or display to a user.

In some implementations, determining the bilateral filter at 608, post processing the alpha channel values at 610, and generating at least a portion of a reconstructed image (e.g., a block) at 612 may be repeated separately for multiple portions of the image. Because values for encoding parameters of the alpha channel are more often shared over the entire image, determining the bilateral filter at 608, post processing the alpha channel values at 610, and generating at least a portion of a reconstructed image at 612 may be performed once for the entire image after decoding all of the alpha channel values at 606.

Decoding the color channel values at 604 can optionally include color space conversion of the decoded color channel values from a first color space, such as from the YUV color space to a second color space. The second color space may be the RGB color space, which includes a red color channel (R), a green color channel (G), and a blue color channel (B). Accordingly, the decoded color channel values can include a red color channel value, a green color channel value, and a blue color channel value. Other color spaces that are or may be further transformed into a visually-perceptible color space for display, such as using a user interface 130, are also suitable for use. The color channel values may be converted to an intermediate color space before being converted to the second color space. The second color space may be the input color space of the original image data.

In some implementations, the input image may be a pre-multiplied image where the alpha channel (i.e., the transparency) is applied to the input color space, e.g., red, green, and blue color channels before conversion to and encoding in the first color space (e.g., YUV). Alternatively, the input image includes unmodified pixel values in the input color space that are converted to an encoded image in the first color space.

Although not expressly shown in FIG. 6, the color channel values decoded at 604 can be filtered using other than a bilateral filter. In an example, the filtering of the color channel values occurs using a post processing filter before generating the reconstructed image at 612. The filtering may occur at a post filtering stage, such as the post filtering stage 514 of the decoder 500. The post processing filter may be a deblocking filter in some implementations.

In general, a bilateral filter may be used as an edge-preserving and noise-reducing smoothing filter for an image. In image compression, however, its use in post processing is undesirable as it would smooth detail of color channels. Application of a bilateral filter in post processing on decompressed alpha values effectively reduces noise added by a lossy compression process without a significant loss of detail. The impact of the filter on visual quality is so large that the filter allows using much more aggressive compression of the alpha channel than would be acceptable in its absence. The strength of the filter can be adjusted depending based on explicit parameters (i.e., those transmitted in the bitstream), implicit parameters (i.e., those deduced from the decoded image), or both, so that differences in encoding quality can be addressed.

A comparison of a reconstructed image without the alpha channel post processing described herein and the reconstructed image including the alpha channel post processing described herein was performed. Without the alpha channel post processing, ringing or mosquito artifacts were visible in the flat regions of the image. The artifacts resulted from the compression of the alpha channel. The artifacts were substantially reduced by application of the alpha channel post processing described herein.

For simplicity of explanation, the method 600 of FIG. 6 is depicted and described as series of steps or operations. However, the steps or operations in accordance with this disclosure can occur in various orders and/or concurrently. Additionally, other steps or operations not presented and described herein may be used. Furthermore, not all illustrated steps or operations may be required to implement a method in accordance with the disclosed subject matter.

The word "example" and the like are used herein to mean serving as an example, instance, or illustration. Any aspect or design described herein as "example" or the like is not necessarily to be construed as preferred or advantageous over other aspects or designs. Rather, use of the word "example" or the like is intended to present concepts in a concrete fashion. As used in this application, the term "or" is intended to mean an inclusive "or" rather than an exclusive "or." That is, unless specified otherwise or clear from context, "X includes A or B" is intended to mean any of the natural inclusive permutations thereof. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. As used herein, the terms "determine" and "identify," or any variations thereof, include selecting, ascertaining, computing, looking up, receiving, determining, establishing, obtaining, or otherwise identifying or determining in any manner whatsoever using one or more of the devices shown in FIG. 1 or FIG. 2.

Further, for simplicity of explanation, although the figures and descriptions herein may include sequences or series of operations or stages, elements of the methods disclosed herein can occur in various orders and/or concurrently. Additionally, elements of the methods disclosed herein may occur with other elements not explicitly presented and described herein. Furthermore, one or more elements of the methods described herein may be omitted from implementations of methods in accordance with the disclosed subject matter.

The implementations of the transmitting computing and communication device 100A and/or the receiving computing and communication device 100B (and the algorithms, methods, instructions, etc., stored thereon and/or executed thereby) can be realized in hardware, software, or any combination thereof. The hardware can include, for example, computers, IP cores, ASICs, programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably. Further, portions of the transmitting computing and communication device 100A and the receiving computing and communication device 100B do not necessarily have to be implemented in the same manner.

Further, in one implementation, for example, the transmitting computing and communication device 100A or the receiving computing and communication device 100B can be implemented using a computer program that, when executed, carries out any of the respective methods, algorithms, and/or instructions described herein. In addition or alternatively, for example, a special-purpose computer/processor, which can contain specialized hardware for carrying out any of the methods, algorithms, or instructions described herein, can be utilized.

The transmitting computing and communication device 100A and the receiving computing and communication device 100B can, for example, be implemented on computers in a real-time video system. Alternatively, the transmitting computing and communication device 100A can be implemented on a server, and the receiving computing and communication device 100B can be implemented on a device separate from the server, such as a hand-held communications device. In this instance, the transmitting computing and communication device 100A can encode content using an encoder 400 into an encoded video signal and transmit the encoded video signal to the communications device. In turn, the communications device can then decode the encoded video signal using a decoder 500. Alternatively, the communications device can decode content stored locally on the communications device, for example, content that was not transmitted by the transmitting computing and communication device 100A. Other suitable transmitting computing and communication device 100A and receiving computing and communication device 100B implementation schemes are available. For example, the receiving computing and communication device 100B can be a generally stationary personal computer rather than a portable communications device, and/or a device including an encoder 400 may also include a decoder 500.

Further, all or a portion of implementations can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or semiconductor device. Other suitable mediums are also available.

The above-described implementations have been described in order to allow easy understanding of the application and are not limiting. On the contrary, the application covers various modifications and equivalent arrangements included within the scope of the appended claims, which scope is to be accorded the broadest interpretation as is permitted under the law so as to encompass all such modifications and equivalent arrangements.

What is claimed is:

1. A method of coding using alpha channel post processing, comprising:

decoding, from multiple color channels of a bitstream, color channel values for an encoded image;

decoding, from an alpha channel of the bitstream, alpha channel values for the encoded image;

determining a bilateral filter based on a level of compression for encoding the alpha channel;

post processing the alpha channel values by filtering the alpha channel values using the bilateral filter to obtain filtered alpha channel values; and generating at least a portion of a reconstructed image corresponding to the encoded image using the filtered alpha channel values and the color channel values.

2. The method of claim 1, wherein a quantization value of the alpha channel indicates the level of compression.

3. The method of claim 2, wherein:

the bilateral filter comprises one of a plurality of candidate bilateral filters;

a first candidate bilateral filter is associated with a first quantization value of the alpha channel;

a second candidate bilateral filter is associated with a second quantization value of the alpha channel;

the first quantization value is different from the second quantization value; and the first candidate bilateral filter is different from the second candidate bilateral filter.

4. The method of claim 1, wherein the bilateral filter comprises a spatial kernel and a range kernel, and at least one of the spatial kernel or the range kernel is based on the level of compression for encoding the alpha channel.

5. The method of claim 4, wherein:

the spatial kernel of the bilateral filter comprises a two-dimensional kernel having one of at least two candidate kernel sizes; and a candidate kernel size of the at least two candidate kernel sizes increases with the level of compression.

6. The method of claim 4, wherein:

the spatial kernel of the bilateral filter comprises a two-dimensional kernel having one of two candidate kernel sizes;

a smaller candidate kernel size is associated with a higher quality for encoding the alpha channel as indicated by a first value for the level of compression; and a larger candidate kernel size is associated with a lower quality for encoding the alpha channel as indicated by a second value for the level of compression.

7. The method of claim 4, wherein:

the spatial kernel comprises exp $$\left(-\frac{i^2 + j^2}{2 * \text{radius}}\right);$$

i is a horizontal distance from the kernel center;

j is a vertical distance from the kernel center; and radius is an integer based on the level of compression.

8. The method of claim 7, wherein:

radius is either 1 or 2, such that the spatial kernel has a kernel size of either 3×3 or 5×5.

9. The method of claim 4, wherein:

the range kernel of the bilateral filter comprises one of at least two candidate one-dimensional (1D) kernels; and a level of smoothing of the at least two candidate 1D kernels increases with increasing levels of compression.

10. The method of claim 4, wherein:

the range kernel comprises esp $$\left(-\frac{k^2}{2 * \text{sigma}^2}\right);$$

k is an absolute difference between two pixel values; and sigma is a smoothing parameter that is a positive integer, such that different values for the smoothing parameter result in candidate one-dimensional (1D) kernels having different levels of smoothing.

11. The method of claim 10, wherein sigma comprises one of at least two values, such that the range kernel has one of at least two different levels of smoothing.

12. The method of claim 10, wherein sigma is 5, 10, or 20.

13. The method of claim 1, further comprising:

filtering, using a color channel filter that is other than a bilateral filter, at least some of the decoded color channel values.

14. An apparatus comprising a decoder configured to perform the method of claim 1.

15. An apparatus for coding using alpha channel post processing, comprising:

a processor configured to perform a method comprising:

decoding, from multiple color channels of a bitstream, color channel values for an encoded image;

decoding, from an alpha channel of the bitstream, alpha channel values for the encoded image;

determining a bilateral filter based on a level of compression for encoding the alpha channel;

post processing the alpha channel values by filtering the alpha channel values using the bilateral filter to obtain filtered alpha channel values;

applying a deblocking filter to at least some of the color channel values to obtain filtered color channel values; and generating at least a portion of a reconstructed image corresponding to the encoded image using the filtered alpha channel values and the filtered color channel values.

16. The apparatus of claim 15, wherein:

a quantization value of the alpha channel indicates the level of compression;

the bilateral filter comprises one of a plurality of candidate bilateral filters;

a first candidate bilateral filter is associated with a first quantization value of the alpha channel;

a second candidate bilateral filter is associated with a second quantization value of the alpha channel;

the first quantization value is different from the second quantization value; and the first candidate bilateral filter is different from the second candidate bilateral filter.

17. The apparatus of claim 15, wherein the bilateral filter comprises a spatial kernel and a range kernel, and at least one of the spatial kernel or the range kernel is based on the level of compression for encoding the alpha channel.

18. The apparatus of claim 17, wherein:

the spatial kernel of the bilateral filter comprises a two-dimensional kernel having one of at least two candidate kernel sizes; and a candidate kernel size of the at least two candidate kernel sizes increases with the level of compression.

19. The apparatus of claim 17, wherein:

the spatial kernel of the bilateral filter comprises a two-dimensional kernel having one of two candidate kernel sizes;
a smaller candidate kernel size is associated with a higher quality for encoding the alpha channel as indicated by a first value for the level of compression; and
a larger candidate kernel size is associated with a lower quality for encoding the alpha channel as indicated by a second value for the level of compression.

20. The apparatus of claim 17, wherein:

the spatial kernel comprises $\exp(-(i^2+j^2)/(2*radius))$;
i is a horizontal distance from the kernel center;
j is a vertical distance from the kernel center;
radius is an integer of either 1 or 2 based on the level of compression such that the spatial kernel has a kernel size of either 3×3 or 5×5.

21. The apparatus of claim 17, wherein:

the range kernel of the bilateral filter comprises one of at least two candidate one-dimensional (1D) kernels;
the range kernel comprises $\exp(-k^2/(2*[[sigma]]^2))$;
k is an absolute difference between two pixel values; and
sigma is a smoothing parameter that is a positive integer, such that different values for the smoothing parameter result in candidate one-dimensional (1D) kernels having different levels of smoothing.

* * * * *